Nov. 3, 1964

P. G. HANSEL 3,155,971

MISSILE SCORING SYSTEM

Filed Oct. 6, 1960

INVENTOR
PAUL G. HANSEL

BY Roy C. Hoppard
ATTORNEY

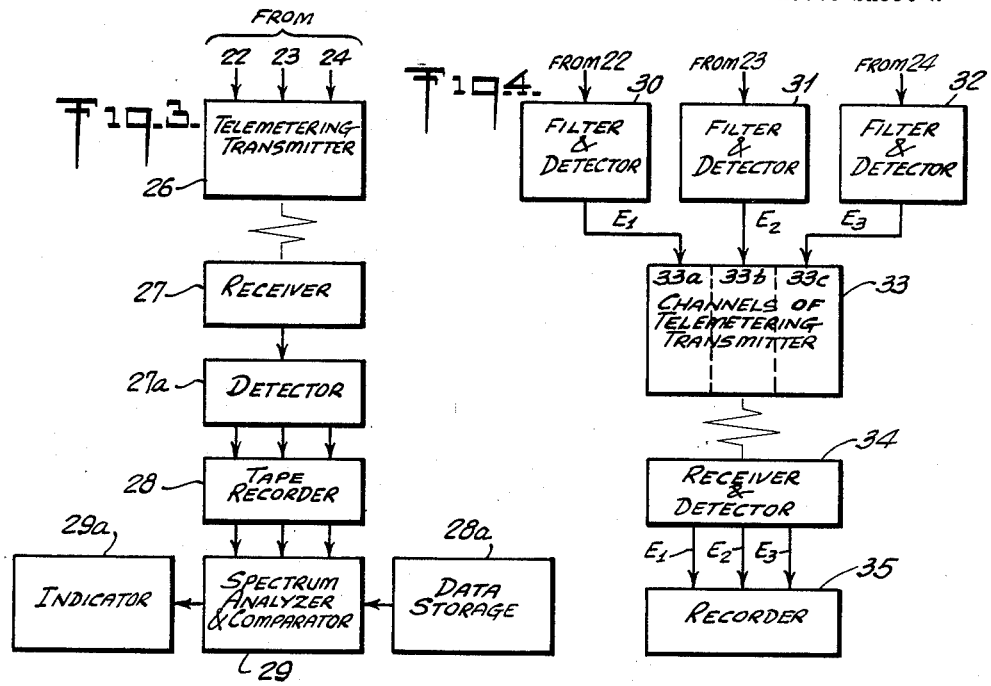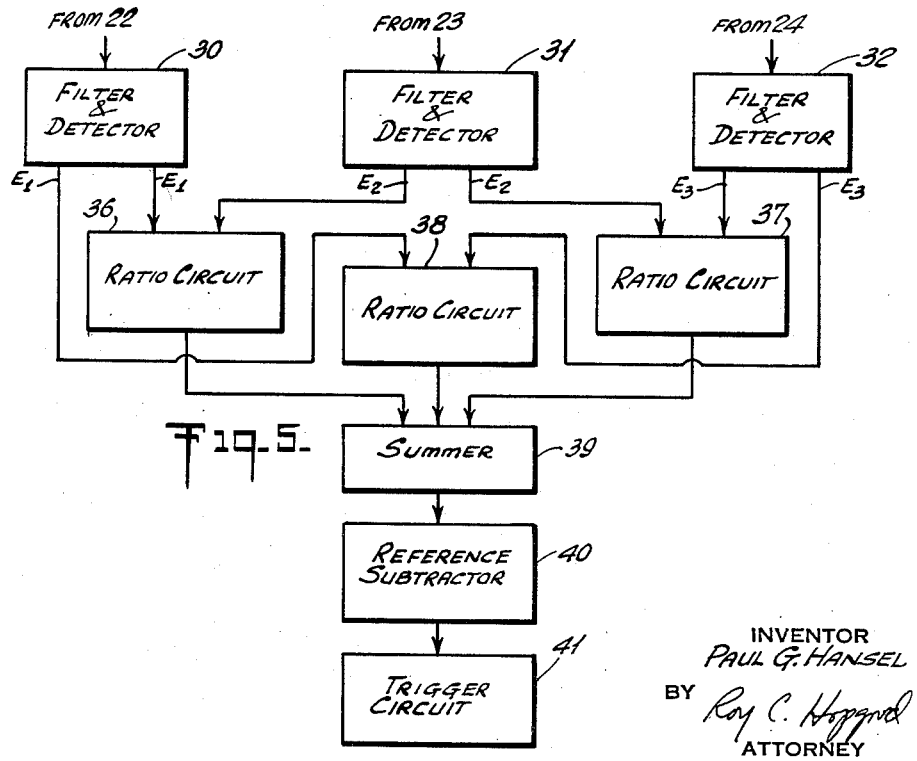

3,155,971
MISSILE SCORING SYSTEM
Paul G. Hansel, Greenville, N.Y., assignor to Servo Corporation of America, Hicksville, N.Y., a corporation of New York
Filed Oct. 6, 1960, Ser. No. 60,924
5 Claims. (Cl. 343—12)

This invention relates to a missile scoring system and, more specifically, to a system for detecting on a go-no-go basis near misses of a projectile with respect to a target drone.

Scoring systems are known which employ optic, acoustic, electrostatic, magnetostatic, or magnetodynamic principles for detecting the occurrence of a "hit."

Scoring systems employing optical approaches are deficient due to background light interference, while acoustic systems cannot be utilized, since the drone and missile closing speeds are in the supersonic range. Further, systems utilizing electrostatic, magnetostatic or magnetodynamic principles require knowledge about either atmospheric and missile electrification, or, data relating to the instantaneous performance of the missile. This data is difficult to obtain and, therefore, these systems necessarily are limited in application.

Most forms of radar also fail to provide a satisfactory approach to the problem. For example, a pulse radar system, capable of meeting the minimum range requirement for "near hit distance," has to employ millimicrosecond pulses. In addition, it requires such complex circuitry, and utilizes such a large power consumption that the practical limitations of cost, size and weight for such a system are exceeded. In like manner, a frequency modulated, continuous wave radar system cannot be utilized, since the Doppler shifts, which would occur at the supersonic speeds of the air vehicles, are comparable to the frequency modulation deviation existing at short ranges.

Accordingly, it is a primary object of the invention to provide a simple, reliable and expendable system for scoring missile firings which pass the drone within a predetermined distance and constitute a satisfactory "near miss." The novel scoring system, for example, may be preset for "hit distances" in the range of 15–50 feet.

It is another object of the invention to provide a continuous wave, Doppler radar system for scoring near miss "hits."

A further object is to provide an active type system in a drone aircraft target which does not require cooperation from the attacking missile.

In accordance with an aspect of the invention, a drone aircraft target is equipped with antennas which transmit a signal having a specific frequency. The antennas are positioned on the drone structure at spaced locations. The echo of the radiated signals received at the spaced antennas from a test fired projectile has a Doppler shift which is not considerably different when the missile is at a considerable distance from the target. However, as the missile approaches the target, the differences between the Doppler shifts become more apparent at the spaced antennas. These differences are detected and compared with predetermined "hit" criteria to indicate a "hit."

The above mentioned and other features and objects of this invention and the manner of attaining them will become more apparent and the invention itself will be understood by reference to the following description of an embodiment of the invention taken in conjunction with the accompanying drawing, wherein:

FIG. 3 is a block diagram of one form of a scoring arrangement;

FIG. 4 is a second form of a scoring arrangement; and,

FIG. 5 is a third form of a scoring arrangement.

Figure 1:
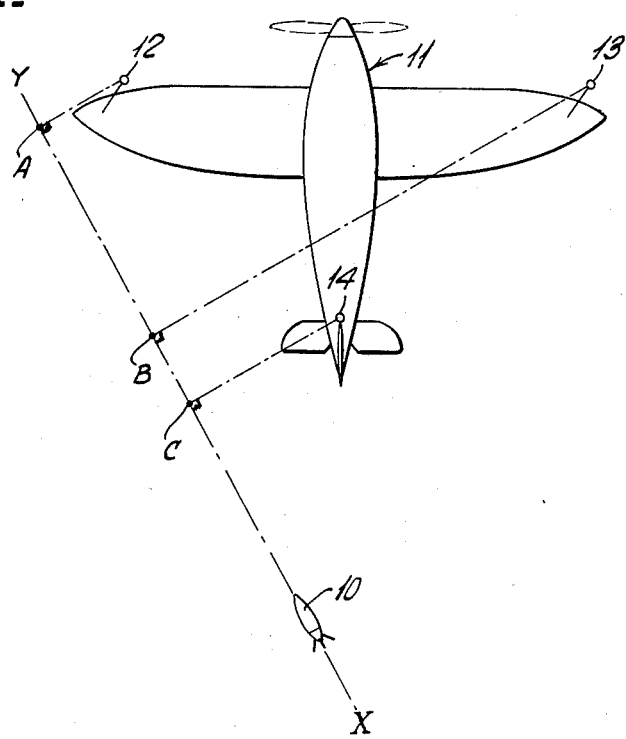
FIG. 1 is a top view of a drone aircraft and a missile test fired at the drone.
Figure 2:
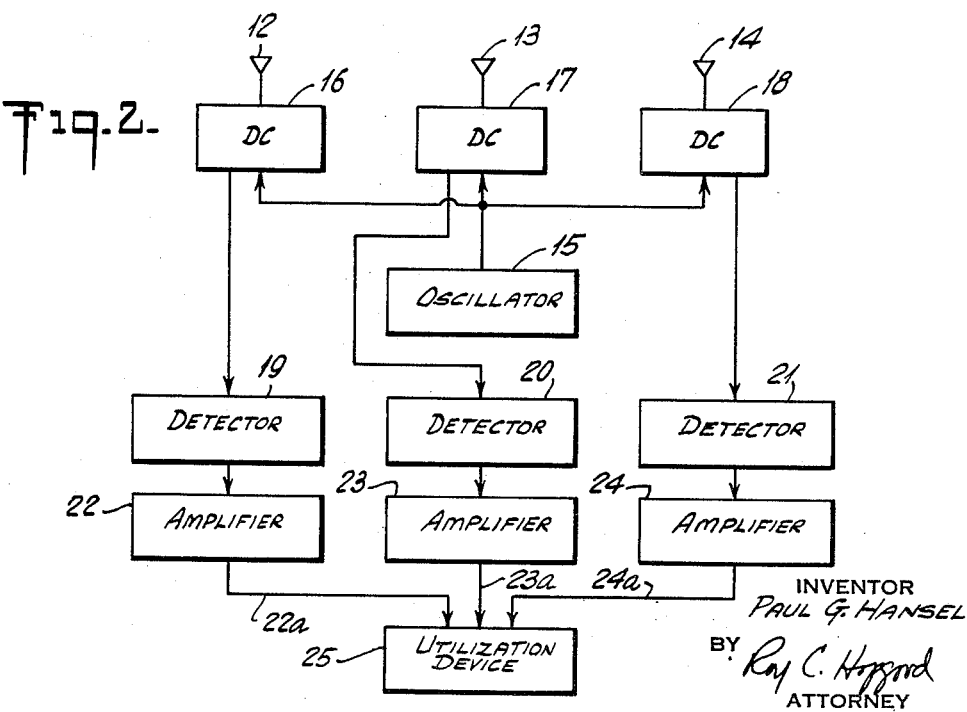
FIG. 2 is a block diagram of the receiving and transmitting arrangement of the system.

Referring now to FIGS. 1 and 2, a projectile, such as a missile 10, is fired from a remote station (not shown) at a drone aircraft target 11. The missile 10 follows a course, e.g. X–Y with respect to the drone 11, and if it enters a zone of predetermined distance around the drone a "hit" is scored.

The drone is provided with three antennas 12–14 which are mounted at spaced apart locations on the structure of the aircraft. For example, the antennas may be located at the edges of the wing structures and at the tail control surface; the positions of the antennas 12–14 being as far apart from each other as the structure of the aircraft permits so as to maximize the differences in distance between the missile and each antenna. It will become more apparent from the description which follows that optimum accuracy of the system is obtained by maximizing these distances.

Each antenna 12–14 radiates a signal of a desired nominal frequency $f_0$ which is generated in a low power, continuous wave oscillator 15 (FIG. 2). The signal is fed through separate directional couplers 16–18 to the antennas 12–14 respectively. The nominal frequency, preferably, is chosen from the range of 1,000 to 10,000 megacycles.

The signal radiated by each antenna experiences a frequency shift in transmission from the antenna to the missile due to the Doppler effect. For example, the signal radiated by antenna 12 experiences a shift $\Delta f_{12}$, where $$\Delta f_{12} = \frac{f_0 v_{12}}{c}$$

$v_{12}$ being the instantaneous closing speed of the missile 10 with respect to the antenna 12 and $c$ being the speed of light.

Similarly, the signals radiated by the antennas 13–14 experience frequency shifts $\Delta f_{13}$ and $\Delta f_{14}$ which depend on $v_{13}$ and $v_{14}$, the instantaneous closing speeds of the missile 10 to the antennas 13–14 respectively. Each antenna 12–14 detects an echo having a Doppler frequency shift twice these values. The Doppler shifts, therefore, detected at each of the antennas depend on the instantaneous closing speed of the missile with respect to that antenna, the frequency $f_0$ of the transmitted signal and the speed of light $c$ being constant and predetermined for a particular set of operating conditions.

The magnitude of the Doppler shift for two way transmission is approximately two cycles per megacycle per Mach number. Since closing speeds in excess of Mach 1 are common, a radiated frequency in the range of 1,000 to 10,000 megacycles will provide a maximum Doppler shift which has a lower limit in the range of two to twenty kilocycles.

When the missile 10 is at a considerable distance from the drone 11, the echo detected by each of the antennas 12-14 has substantially the same Doppler shift, since the relative distances between each antenna and the location of missile 11 are practically the same; the instantaneous closing speeds relative to the three antennas being almost indistinguishable. However, as the missile 10 approaches the drone 11, the differences in the Doppler shift detected by each of the antennas become proportionately greater. The missile traveling at a greater speed than the drone eventually passes the drone. However, at the instant of time that the missile is closest to the drone, i.e., the approaching missile is now becoming a departing missile, the Doppler shift experiences a "zero." Since the antennas are spaced, the missile travels through these "zeros" at different times. In FIG. 1, the "zero" positions for the missile are illustrated at the intersections A, B and C between the course line X-Y and the perpendicular lines drawn from the respective antennas to the course line.

Referring again to FIG. 2, the echo signals detected by the antennas 12-14 are coupled through the directional couplers 16-18 along with a leakage component of the transmitted signal of a frequency $f_0$, to crystal detectors 19-21, respectively. Each crystal detector 19-21 provides a Doppler beat signal output corresponding to the difference between the frequency $f_0$ of the transmitted signal and the frequency of the particular echo signal detected by the associated antenna. The outputs of the crystal detectors 19-21 are individually amplified to a suitable level in the amplifiers 22-24 and the amplified energy is applied over the lines 22a-24a to a utilization device, generally indicated at 25. By establishing a minimum necessary difference in the Doppler shift detected by any two antennas, a "hit" criteria corresponding to particular near misses may be established. If the information provided by the crystal detectors 19-21 is correlated with an established standard, those near misses may be determined which qualify as "hits" at the edge of the "hit zone."

The ascertainment of a "hit" from this information may be accomplished in a number of ways, but since the drone is not usually recovered in test firing procedures, the information relative to "hits" and near-miss hits, ordinarily is telemetered to a scoring station. Referring to FIG. 3, this is accomplished by modulating a telemetering transmitter 26 located on the drone with the Doppler beat signals. The transmitted signal is received at 27 at a scoring station and thereafter the beat signals are detected at 27a. After detection they are tape recorded at 28 and applied to a spectrum analyzer 29. Reference frequency signals are also supplied to the analyzer from a data storage unit 28a, and compared with the difference frequency between any two Doppler shift frequencies as detected on the drone. The difference between any two Doppler shift frequencies and the reference frequency as then applied to an indicator 29a, for example, may correspond to a "hit" in terms of the drone geometry and the closing speed, whereby if the difference in the Doppler shift frequencies exceeds the reference frequency, a hit is indicated. The approximate closing speed of the missile on the drone is determined from the maximum values of the Doppler beat frequencies.

Referring to an alternative embodiment of the invention, as shown in FIG. 4, the Doppler beat frequency information provided by the crystal detectors 19-21 may be coupled to individual high pass filter and detector circuits 30-32 for conversion to direct current output signals E1, E2 and E3 corresponding to the three Doppler beat waves. These waves are applied to individual channels 33a-33c of a conventional multichannel telemetering transmitter 33 located on the drone. The waves are received and detected at 34, at a ground scoring station. Thereafter, the individual signals are individually recorded on a three-pen strip chart recorder 35, which indicates the instantaneous values of the direct current signals E1, E2 and E3 and the relative times at which the Doppler shift frequencies pass through zero. Knowing the drone geometry, that is, the positions of the three antennas with respect to each other on the drone, the beat frequency information and the instantaneous times that the missile passes through the Doppler shift zeros, a determination can be made, at the scoring station, as to whether a "hit" has occurred.

The information may also be utilized by establishing a "hit" criteria in terms of the ratios of the Doppler shifts between any two antennas. This may be accomplished in either the drone or at the scoring station.

In the embodiment of FIG. 5, the Doppler shift detected at each crystal detector 19-21 is coupled to individual high pass filter and detector circuits 30-32 to produce direct current signals E1, E2 and E3. Ratio circuits 36-38 are each coupled to two different detector circuits to apply two of the voltages as inputs to produce either an alternating current or direct current output voltage which is proportional to the ratio of the two inputs. The output voltages of the three ratio circuits are summed at 39 to produce a composite signal which is subtracted at 40 from a preset voltage corresponding to a particular hit distance. The different is applied to a trigger circuit 41 which delivers a scoring signal, e.g. a hit, if the ratio of the Doppler beat frequencies between any two antennas exceeds a preset limit.

When this operation is performed in the drone aircraft 11, the scoring signal is transmitted to the ground station, while if it is performed at the scoring station, the direct current voltages E1, E2 and E3, corresponding to the individual Doppler beat frequencies, are telemetered to the ground station as provided in the embodiment of FIG. 4.

While the foregoing description sets forth the principles of the invention in connection with specific circuits, it is to be understood that this description is made only by way of example and not as a limitation of the scope of the invention as set forth in the objects thereof and in the accompanying claims.

What is claimed is:

1. A system for scoring near misses of a projectile with respect to a target, comprising at least three antennas positioned at spaced locations on said target, a source of signals of predetermined frequency coupled to each of said antennas for radiation thereof, separate signal receiving means coupled to each of said antennas for receiving reflected signals from the projectile, the reflected signals received at each antenna being frequency shifted from the frequency of the radiated signal by an amount dependent on the instantaneous closing speed of the projectile with respect to that antenna, means coupled to each of said receiving means for comparing the frequencies of said reflected signals and said radiated signal to produce a difference frequency signal, and scoring means responsive to the difference frequency signal at each antenna for indicating a near miss based on predetermined distance criteria.

2. The system according to claim 1, wherein said scoring means comprises means for transmitting said difference frequency signals from said target, means for receiving and detecting said signals, a reference signal storage for supplying signals of a frequency corresponding to the minimum difference frequency between any two shifted frequencies which would be indicative of a pre-established near miss, and means coupled to said detecting means and to said storage for comparing said signals.

3. The system according to claim 1, wherein said difference frequency goes through "zero" when the projectile direction changes from approaching to departing, and said scoring means comprises a plurality of detecting means coupled respectively to said antennas for detecting the instant that the difference frequency signals at the respective antennas pass through "zero," the time base between zeros being indicative of the distance from the target to the projectile.

4. The system according to claim 1, wherein said scoring means comprises a plurality of detecting means, each being responsive to one of said difference frequency signals for producing a voltage output, a plurality of ratio circuits, each being coupled to different pairs of detecting means for providing an output proportional to the ratio of applied voltages, summing means coupled to the outputs of said ratio circuits for producing a composite signal, means for producing reference data signals corresponding to near miss projectile distance criteria, and means for comparing said composite signal with said reference data signals.

5. The system according to claim 4, wherein said scoring means further comprises means coupled to said detecting means for transmitting from said target waves corresponding to said voltages, and means remote from said target for receiving each of said waves.

References Cited in the file of this patent
UNITED STATES PATENTS
2,866,192   Johnson _____ Dec. 23, 1958